United States Patent
Subbarao

(10) Patent No.: US 11,409,461 B1
(45) Date of Patent: Aug. 9, 2022

(54) EXTENDING SIZE OF MEMORY UNIT

(71) Applicant: Micron Technology, Inc., Boise, ID (US)

(72) Inventor: Sanjay Subbarao, Irvine, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/179,059

(22) Filed: Feb. 18, 2021

(51) Int. Cl.
*G06F 3/06* (2006.01)

(52) U.S. Cl.
CPC .......... *G06F 3/0655* (2013.01); *G06F 3/0619* (2013.01); *G06F 3/0679* (2013.01)

(58) Field of Classification Search
CPC ..... G06F 3/0655; G06F 3/0619; G06F 3/0679
See application file for complete search history.

(56) References Cited

U.S. PATENT DOCUMENTS

| 2014/0181395 A1* | 6/2014 | Vincent ................. G06F 3/0605 711/111 |
| 2021/0011799 A1* | 1/2021 | Chen .................... G06F 3/0619 |
| 2021/0021504 A1* | 1/2021 | Balasubramanian ... H04L 43/18 |

* cited by examiner

*Primary Examiner* — Hiep T Nguyen
(74) *Attorney, Agent, or Firm* — Schwegman Lundberg & Woessner, P.A.

(57) ABSTRACT

Various embodiments described herein provide for extending a size of a memory unit of a memory device, such as a codeword of a page of the memory device, where the memory device can be included by a memory system. In particular, some embodiments implement extending (e.g., increasing) the size of a memory unit (e.g., codeword) to store more data, such as more host data (e.g., user data) and protection data (e.g., parity data), within the memory unit while using a memory unit storage slot (e.g., codeword storage slot in a page) that is smaller in size than the extended memory unit.

20 Claims, 11 Drawing Sheets

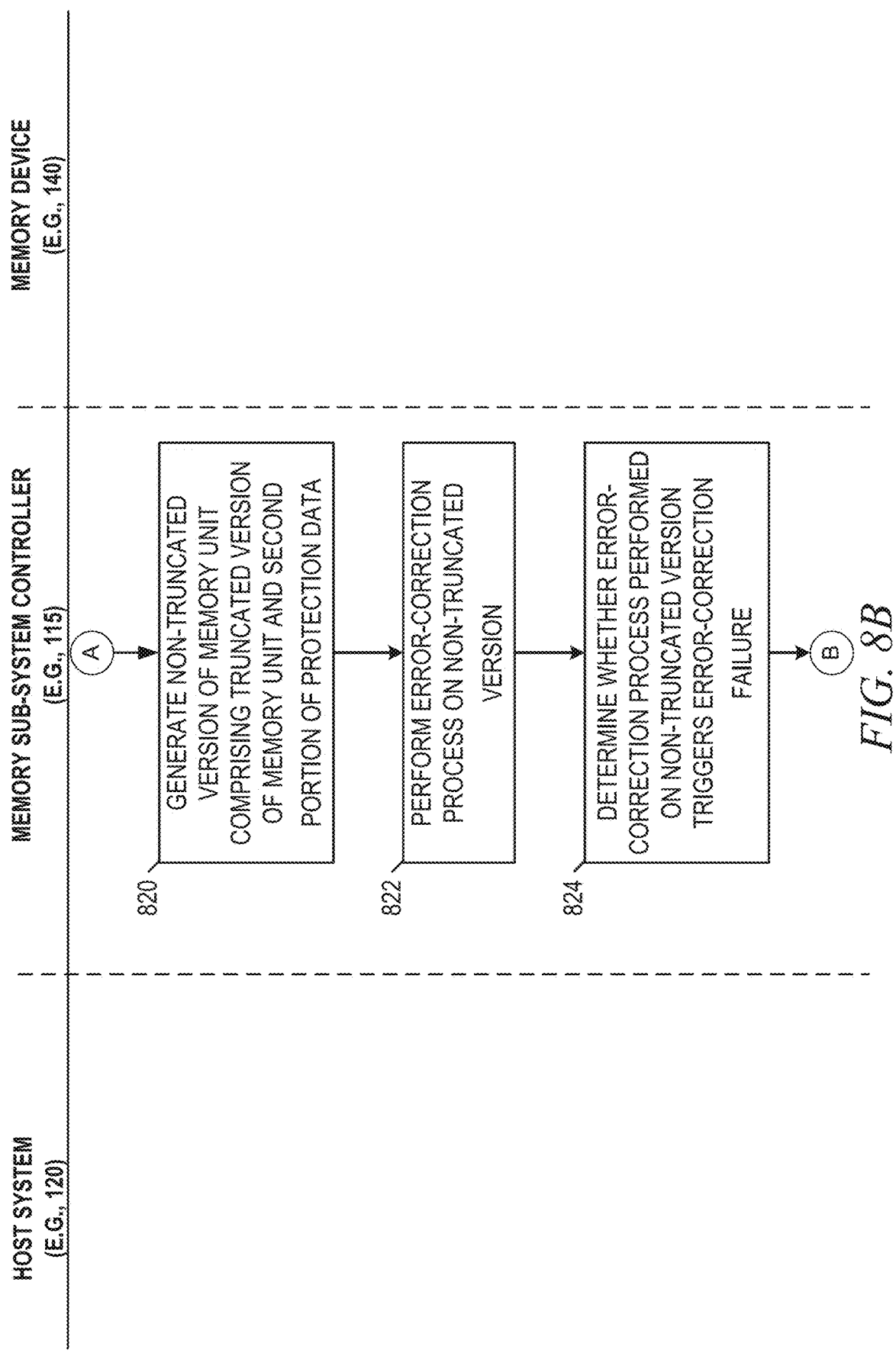

EXTENDING SIZE OF MEMORY UNIT

TECHNICAL FIELD

Embodiments of the disclosure relate generally to memory devices and, more specifically, to extending a size of a memory unit of a memory device, such as a page of the memory device or a codeword of the page.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 8A, 8B, and 8C provide an interaction diagram illustrating interactions between components of a computing environment in the context of some embodiments in which a method for processing a request to read stored data from a memory unit having extended size, as described herein, is performed.

DETAILED DESCRIPTION

Figure 1:
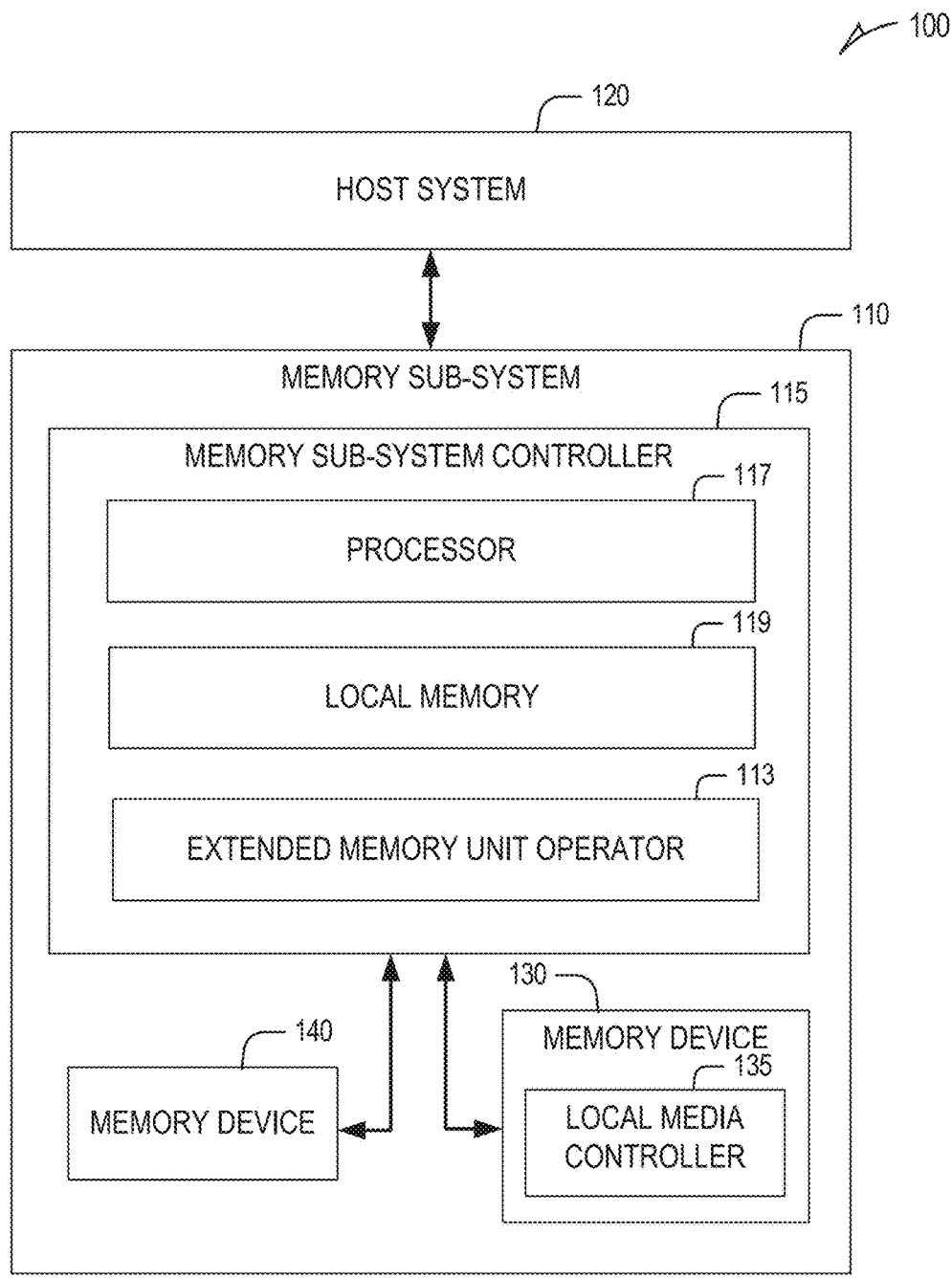
FIG. 1 is a block diagram illustrating an example computing system that includes a memory sub-system, in accordance with some embodiments of the present disclosure.

Aspects of the present disclosure are directed to extending a size of a memory unit of a memory device, such as a codeword of a page of the memory device, where the memory device can be included by a memory system (e.g., a memory sub-system). In particular, some embodiments implement extending (e.g., increasing) the size of a memory unit (e.g., codeword) to store more data, such as more host data (e.g., user data) and protection data (e.g., parity data), within the memory unit while using a memory unit storage slot (e.g., codeword storage slot in a page) that is smaller in size than the extended memory unit. Hereafter, a memory unit with extended size can be referred to as an extended memory unit. Some embodiments truncate an extended memory unit such that protection data of the extended memory unit is punctured (e.g., divided into at least two portions) but the resulting truncated memory unit (e.g., truncated codeword including one portion of the protection data) fits within its intended memory unit storage slot. Additionally, various embodiments implement support for an extended (e.g., increased-size) codeword while at least maintaining a code rate of the codeword (e.g., while continuing to provide adequate amount of parity data, such as low-density parity-check (LDPC) data, within the codeword), which can enable the memory device to meet or maintain target endurance, retention, and reliability characteristics.

A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data (e.g., host data). The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table, also referred to herein as a L2P table), data from logging, scratch pad data, and so forth.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

Traditionally, the size of a page of a NAND-type memory device has been set based on an industry-standard sector size. Generally, each page comprises a certain number of codewords, where each codeword comprises a payload portion (or payload) for storing a certain number of data sectors (or sectors) that store data (or host data) from a host system, and where each codeword comprises a non-payload portion that can include protection data (e.g., parity data) for protecting (e.g., facilitating error correction) of all the data in the codeword. The non-payload portion can also include protection information, cyclic redundancy check (CRC) data, and metadata (e.g., security metadata and firmware metadata), and the like. In the past, the size of a sector used by a host system has been set to 512 bytes and, as result, NAND-type memory devices have been configured with 16-kilobyte pages comprising four 4096-byte codewords, with each codeword comprising a payload storing each store eight 512-byte sectors and comprising parity data for facilitating error correction of the host data stored in the payload.

However, recent developments in memory technology (e.g., for enterprise markets and applications) have caused an increase in sector sizes and payload sizes within each codeword (e.g., increase each to a 4588-byte payload storing eight 528-byte sectors), which usually results in less space in the codeword for storing protection data (e.g., LDPC data). For example, where the protection data contains parity data, the reduction in space can cause the codeword to not store enough parity data to meet target error correction capabilities (e.g., meeting an error correction requirement). Take for instance where the parity data comprise LDPC data; a reduction of space for storing of LDPC data within a codeword would result in a higher code rate (CR) for the codeword. As used herein, a code rate of a codeword is a ratio between the size of the payload of the codeword and the total size of the codeword. For example, where a 4588-byte codeword comprises a 4224-byte payload, the code rate for the codeword would be 0.929. A code rate for a codeword can be used as an indication of data protection (e.g., error protection) power, provided by protection data (e.g., parity data) stored in the codeword, against bit errors within the codeword. Generally, the lower the code rate of a codeword, the more data protection (e.g., error protection) provided to the codeword by its protection data. Hence, when LDPC data is reduced within a codeword, a higher code rate results for the codeword, and the LDPC data provides less data protection power (e.g., bit error correction) over data within the codeword. For certain applications, such as an enterprise application, it is desirable to have a code rate of less than 0.929 for a codeword of a page of a NAND-type memory device, as this can ensure that the NAND-type memory device meets specific reliability (e.g., sufficiently overcomes bit error rate of the memory device), endurance, and data retention expectations. Unfortunately, increasing sector and payload size within codewords, without increasing the size of the codewords in the page or without increasing the size of the page itself, can result in higher code rates and reduced/weakened data protection power.

Aspects of the present disclosure address the above and other deficiencies by extending a size of a memory unit (e.g., a page or a codeword in a page) of a memory device without increasing the size of a memory unit storage slot used to store the memory unit on the memory device. A memory unit extended in size in accordance with an embodiment can be referred to as an extended memory unit. For instance, some embodiments extend a size of a codeword of a page (to produce an extended codeword) while avoiding an increase in size of a codeword storage slot within the page or avoiding an increase of a code rate of the codeword. Various embodiments described herein facilitate extending a size of a memory unit by truncating an extended memory unit (e.g., extended codeword) to generate a truncated version of the extended memory unit (truncated memory unit), where the truncated memory unit is generated such that it can fit in a memory unit storage slot (e.g., codeword storage slot) and where protection data (e.g., parity data) of the extended memory unit is punctured (e.g., divided) into a first portion and a second portion of protection data and the second portion of protection data is stored separately from the truncated memory unit.

For instance, an embodiment can generate an extended codeword that is larger than a target codeword storage slot (of a page of a memory device) where the extended codeword is to be stored. The embodiment can divide (e.g., split or deconstruct) the extended codeword into a first codeword portion comprising at least a payload for storing host data and a first portion of protection data (e.g., first portion of parity data) for the extended codeword, and a second codeword portion comprising a second portion of protection data (e.g., second portion of parity data) for the extended codeword, where the first and second portions of protection data form original protection data for the extended codeword. The embodiment can store the first codeword portion in the target codeword storage slot, and can store the second codeword portion in another codeword storage slot (e.g., of the same page or a different page). In this way, an extended codeword described herein can be truncated (e.g., shortened) to fit into its intended (target) codeword storage slot (e.g., codeword storage slot having a size ¾ page), and the (punctured/divided) protection data that results from the truncation can be stored elsewhere (to be accessed when needed for error correction operations on the extended codeword). As a result, various embodiments enable a codeword to be extended in size to support a larger payload size or sector size therein (larger than otherwise possible by conventional technologies), while the extended codeword can use the existing size of codeword storage slots (e.g., ¾ page-sized storage slots originally configured to fit a ¾ page-sized codewords) and a target code rate for the extended codeword can still be achieved. Depending on the embodiment, the second codeword portion (comprising the second portion of protection data) that results from truncation of an extended codeword can be stored in a different codeword storage slot in the same page as the first codeword portion resulting from the truncation, or in a codeword storage slot of a different page of the memory device. Additionally, the second codeword portions resulting from the truncation of multiple codewords (e.g., of a same page or different pages) can be collectively stored in one or more codeword storage slots of a different page.

Various embodiments perform an operation (e.g., read operation or write operation) on an extended memory unit based on the separate storage of a truncated version of the extended memory unit, within a first memory unit storage slot at a memory location of a memory device, and storage of a portion of protection data for the extended memory unit, within a second memory unit storage slot (e.g., at the same or another memory location of the memory device). For instance, after an extended codeword has been divided and a first codeword portion (comprising host data and a first portion of protection data) and a second codeword portion (comprising a second portion of protection data) are stored separately on a memory device, the extended codeword can be read from the memory device by initially processing the first codeword portion, using the first portion of protection data and without the second codeword portion (e.g., without the second portion of protection data included), using an error-correction component (e.g., error-correction engine, such as an LDPC engine). For instance, where the error-correction component expects to receive and process an extended codeword, the error-correction component can be provided with only the first codeword portion and instructed/configured to ignore the remainder of the extended codeword corresponding to the second codeword portion (e.g., avoid error correction of the remainder of the extended codeword). When no data error is detected by the error-correction component, various embodiments can avoid having to access and use the second codeword portion to correct the extended codeword. However, in response to the error-correction component detecting a data error in the first codeword portion (e.g., detecting a LDPC trigger or a LDPC failure) and failing to correct the data error using the first portion of protection data, the second codeword portion (including the second portion of protection data) can be accessed from the memory device, and the first codeword portion can be processed by the error-correction component but with the second codeword portion (e.g., the error-correction component is instructed/configured to stop ignoring the remainder of the extended codeword corresponding to the second codeword portion). In doing so, the error-correction component has ability to error correct the extended codeword using the second portion of protection data (e.g., the second portion of parity data) from the second codeword portion accessed after failure by the error-correction component. Though some embodiments are described herein with respect to codewords, various embodiments described herein can be applied to different types of memory units used on a memory device.

By use of some embodiments, protection data (e.g., parity data) stored in a memory unit (e.g., a codeword within a page) of an existing memory device (e.g., NAND-type memory device) can be extended without having to reconfigure the size of the memory unit storage slot (e.g., codeword storage slot) used to store the extended memory unit on the memory device. In doing so, strong code rate (e.g., a CR less than 0.929 by using adequate LDPC parity) can be achieved for a codeword without increasing the size of the codeword storage slot within a page of a memory device.

As used herein, a memory unit can comprise a page of a memory device or a codeword of the page. As used herein, a portion of a page can store multiple codewords. For instance, a page can store four codewords (e.g., four 4 KB codewords). As used herein, a code rate can comprise a ratio between total host data stored within the codeword (e.g., size of the host sector within the codeword) and the total size of the codeword. As used herein, protection data can comprise parity data, such as LDPC data. As used herein. LDPC represents an example of an error correction algorithm. Various embodiments can use other types of error correction algorithms, such as erasure coding algorithms. As used herein, an extended memory unit can refer to a memory unit that has a size that is larger (e.g., a codeword extended to be larger in size) than an individual memory unit storage slot (e.g., codeword storage slot) used to store an individual memory unit (e.g., codeword) on a memory device. As used herein, a non-truncated version of a memory unit (non-truncated memory unit) can represent the memory unit in its entirety. A non-truncated version of a memory unit can comprise: a truncated version of the memory unit that includes a first portion of protection data; and a second portion protection data for the non-truncated version of the memory unit. As used herein, a truncated version of a memory unit (truncated memory unit) can represent a version of the memory unit that includes a first portion of protection data but that is truncated to fit into a memory unit store slot of a memory device.

Disclosed herein are some examples of extending a size of a memory unit of a memory device, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance). Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface. Fibre Channel. Serial Attached SCSI (SAS). Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI). Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, SLCs, can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes an extended memory unit operator 113 that enables or facilitates operations with respect to an extended memory unit on a memory device of the memory sub-system 110, such as one of the memory devices 130, 140. For some embodiments, the memory sub-system controller 115 receives, from the host system 120, a request to read stored data (e.g., stored host data) from a memory address, where the memory address corresponds to a memory location on the memory device (e.g., 130, 140). In response to the request, the memory sub-system controller 115 can process the request to read stored data from the memory address. For some embodiments, the memory sub-system controller 115 processes the request to read stored data from the memory address by accessing the truncated version of a select memory unit (truncated memory unit) from the memory location, where the truncated version of the select memory unit is accessed from a select position (e.g., select memory unit storage slot) in the memory location. The truncated version of the select memory unit can comprise a first portion of protection data for a non-truncated version of the select memory unit, and can exclude a second portion of protection data for the non-truncated version of the select memory unit. The select memory unit represents an extended memory unit that is sized larger than a memory unit storage slot (of a memory location) intended to store the extended memory unit; as described herein, the extended memory unit can be truncated by an embodiment described herein to fit into the memory unit storage slot. The memory locations can comprise a page of a memory device (e.g., 130, 140), and the memory location can comprise a plurality of memory unit storage slots (e.g., codeword storage slots), such as four codeword storage slots that each comprise ¼ page.

According to various embodiments, the memory sub-system controller 115 processes the request to read stored data from the memory address by: performing an error-correction process on a truncated version of the select memory unit (truncated memory unit) accessed from the memory location; and determining whether the error-correction process performed on the truncated version triggers an error-correction failure. For some embodiments, the error-correction process is performed on the truncated version of the select memory unit based on the first portion of protection data (included by the truncated version). For some embodiments, the truncated version of the select memory unit excludes the second portion of protection data for the non-truncated version of the select memory unit (non-truncated memory unit). For some embodiments, the error-correction process is performed on the truncated version of the select memory unit such that the error-correction process uses the first portion of protection data (from the truncated version) and ignores the second portion of protection data excluded from the truncated version of the select memory unit. For instance, the error-correction process can comprise a LDPC process (e.g., performed via a LDPC decoder of a memory system), and the low-density parity-check process can ignore the second portion of protection data excluded from the truncated version of the select memory unit by using erasure zeroes (e.g., phantom zeroes). The protection data can comprise parity data for the non-truncated version of the select memory unit. For example, the parity data can comprise LDPC data, and the error-correction process can comprise a LDPC process. The error-correction failure can comprise a failure by the error-correction process to error correct the truncated version of the select memory unit based on the first portion of protection data. For instance, the error-correction failure can comprise a LDPC failure (e.g., hard LDPC failure).

For some embodiments, in response to determining that the error-correction process performed on the truncated version of the select memory unit does not trigger the error-correction failure, the memory sub-system controller 115 generates at least part of a response to the host system 120, for the request, using a result produced by the error-correction process performed on the truncated version of the select memory unit. The result of the error-correction process performed on the truncated version can comprise the truncated version of the select memory unit with one or more error-corrections applied (e.g., an error-corrected version of the select memory unit) based on the first portion of protection data. Accordingly, the response for the host system 120 can include host data from a payload portion of the truncated version of the select memory unit as provided via the result of the error-correction process (e.g., with error corrections applied). Alternatively, according to some embodiments, in response to determining that the error-correction process performed on the truncated version of the select memory unit triggers the error-correction failure, the memory sub-system controller 115 accesses the second portion of protection data from a different memory unit of the memory device. The different memory unit can be stored in the same memory location (e.g., same page) of the memory device (e.g., 130, 140) as where the truncated version of the select memory unit is stored, or the different memory unit can be stored at a different memory location (e.g., different page) of the memory device. According to various embodiments, the memory sub-system controller 115 generates (e.g., reconstructs) the non-truncated version of the select memory unit (non-truncated) by combining the truncated version of the select memory unit, accessed from the memory location, with the second portion of protection data accessed from the different memory unit. Combining the truncated version of the select memory unit with the second portion of protection data can comprise appending (e.g., reattaching) the protection data to the truncated version of the select memory unit, thereby restoring or reconstructing the select memory unit in its entirety.

Thereafter, the memory sub-system controller 115 of some embodiments performs the error-correction process on the non-truncated version of the select memory unit based on the first portion of protection data and the second portion of protection data. For some embodiments, the memory sub-system controller 115 determines whether the error-correction process performed on the non-truncated version of the select memory unit triggers the error-correction failure. According to some embodiments, in response to determining that the error-correction process performed on the non-truncated version of the select memory unit does not trigger the error-correction failure, the memory sub-system controller 115 generates at least part of a response to the host system 120, for the request, using a result produced by the error-correction process performed on the non-truncated version of the select memory unit. The result of the error-correction process performed on the non-truncated version can comprise the non-truncated version of the select memory unit with one or more error-corrections applied (e.g., an error-corrected version of the select memory unit) based on the first portion of protection data and the second portion of protection data. Accordingly, the response for the host system 120 can include host data from a payload portion of the non-truncated version of the select memory unit, as provided via the result of the error-correction process (e.g., with error corrections applied).

For some embodiments, the memory sub-system controller 115 receives, from the host system 120, a request to write host data to a memory address, where the memory address corresponds to a memory location on the memory device (e.g., 130, 140). In response to the request, the memory sub-system controller 115 can process the request to write host data to the memory address. For some embodiments, the memory sub-system controller 115 processes the request to write host data to the memory address by generating a non-truncated version of a select memory unit based on a select portion of the host data, where the non-truncated version of the select memory unit comprises (e.g., a portion representing) a truncated version of the select memory unit, which includes a first portion of protection data, and comprises (e.g., a portion representing) a second portion of protection data for the non-truncated version of the select memory unit. From the non-truncated version of the select memory unit, an embodiment can divide the non-truncated version of the select memory unit into the truncated version of the select memory unit and the second portion of protection data of the non-truncated version of the select memory unit. As described herein, the truncated version of the select memory unit can be sized such that it can fit within a memory unit storage slot of the memory location of the memory device. Generating the non-truncated version of the select memory unit can comprise truncation (e.g., division) of the non-truncated version of the select memory unit. From the non-truncated of the select memory unit, the memory sub-system controller 115 of some embodiments stores the truncated version of the select memory unit to the memory location, where the truncated version of the select memory unit comprises a first portion of protection data for a non-truncated version of the select memory unit and excludes a second portion of protection data for the non-truncated version of the select memory unit. According to various embodiments, the truncated version of the select memory unit is stored in a memory unit storage slot of the memory location. For various embodiments, the memory unit storage slot (being used to store the truncated version of the select memory unit) is too small in size to store the non-truncated version of the select memory unit, but the truncated version of the select memory unit has a size that is either smaller than or equal to the size of the memory unit storage slot. Additionally, from the non-truncated version of the select memory unit, the memory sub-system controller 115 of some embodiments stores the second portion of protection data to a select position in a different memory unit of the memory device. In this way, the second portion of protection data can be stored separately from the truncated version of the select memory unit. For various embodiments, the different memory unit is stored in a first memory unit storage slot that is different from a second memory unit storage slot used to store the truncated version of the select memory unit. The first and second memory unit storage slots can be of the same memory location (e.g., same page of the memory device 130), or each can be part of separate memory locations (e.g., two different pages of the memory device 130). The different memory unit (e.g., different codeword), used to store the second portion of protection data for the non-truncated version of the select memory unit, can be used to store second portions of protection data for multiple, different non-truncated memory units (e.g., multiple non-truncated codewords), with the second portion of protection data for each non-truncated memory unit being stored at a different (e.g., assigned) position within the different memory unit.

Figure 6:
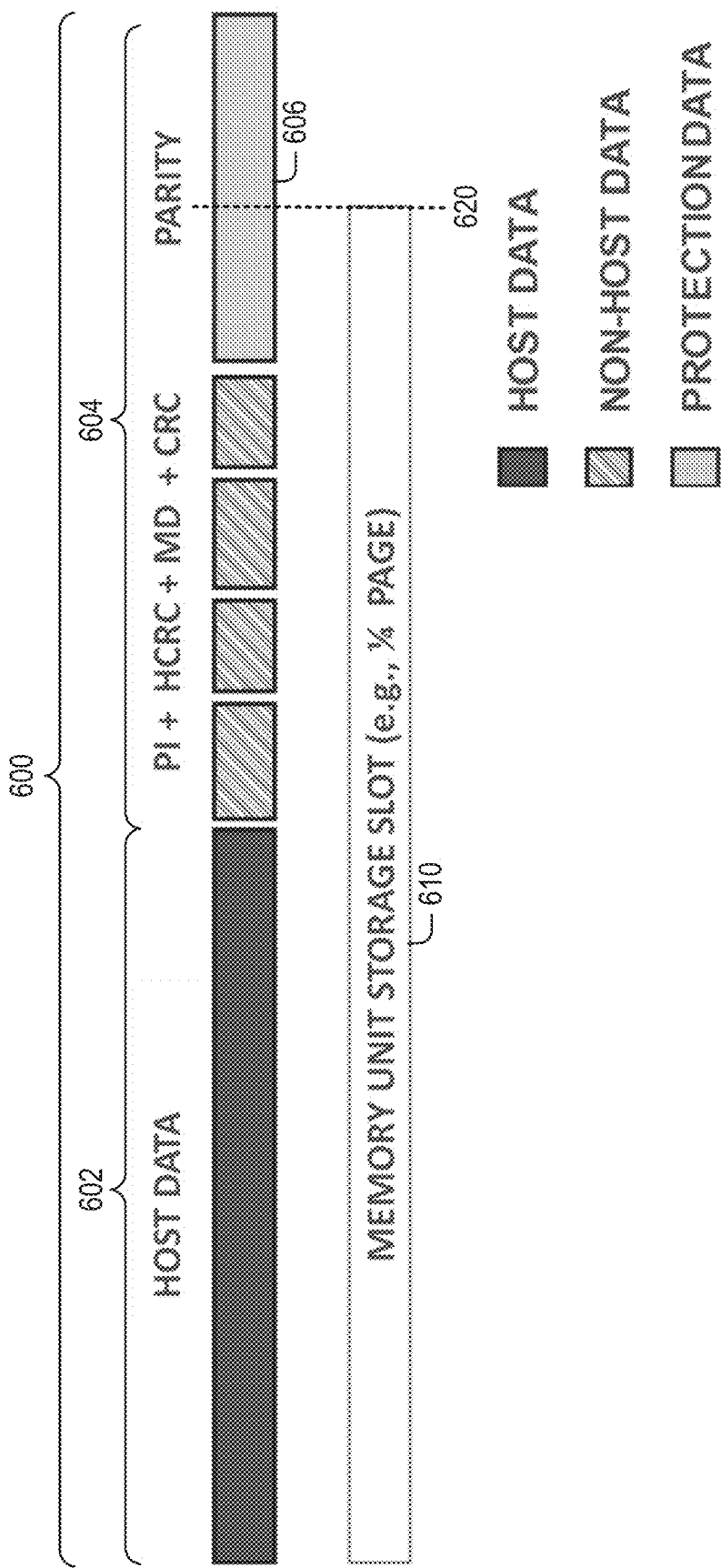
FIG. 6 is a diagram illustrating an example of a memory unit having extended size, in accordance with some embodiments of the present disclosure.

Examples of a non-truncated version of a memory unit (e.g., non-truncated codeword) and a memory unit storage slot (e.g., codeword storage slot) of a page is illustrated and described with respect to FIG. 6. Examples of storage of truncated memory units (e.g., truncated codewords) and storage of second portions of protection data separately from the truncated memory units are illustrated and described with respect to FIG. 7.

Depending on the embodiment, the select memory unit can comprise a first codeword, and the different memory unit can comprise a second (different) codeword. For instance, the select memory unit can comprise a first codeword, where the first codeword comprises a payload portion and a non-payload portion, where the payload portion is configured to store data (e.g., host data) provided by the host system 120, and where the non-payload portion comprises a first portion of protection data. The non-payload portion can also comprise, for instance, at least one of protection information for the first codeword, cyclic redundancy check (CRC) data for the first codeword, and metadata for the first codeword. The different memory unit can comprise a second codeword, where the second codeword can be configured to store second portions of protection data for a plurality of codewords of the memory device (e.g., 130, 140), and where the plurality of codewords includes the first codeword. For example, the second codeword can comprise a payload portion and a non-payload portion, and where the payload portion can be configured to store second portions of protection data for the plurality of codewords, and where the non-payload portion can be configured to store non-host data (e.g., protection information. CRC data, metadata, and the like) for the second codeword.

FIGS. 2 through 5 are flow diagrams of example methods for performing an operation on a memory unit having an extended size, in accordance with some embodiments of the present disclosure. The methods 200, 300, 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 200, 300, 400, 500 is performed by the memory sub-system controller 115 of FIG. 1 based on the extended memory unit operator 113. Additionally, or alternatively, for some embodiments, at least one of the methods 200, 300, 400, 500 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 2:
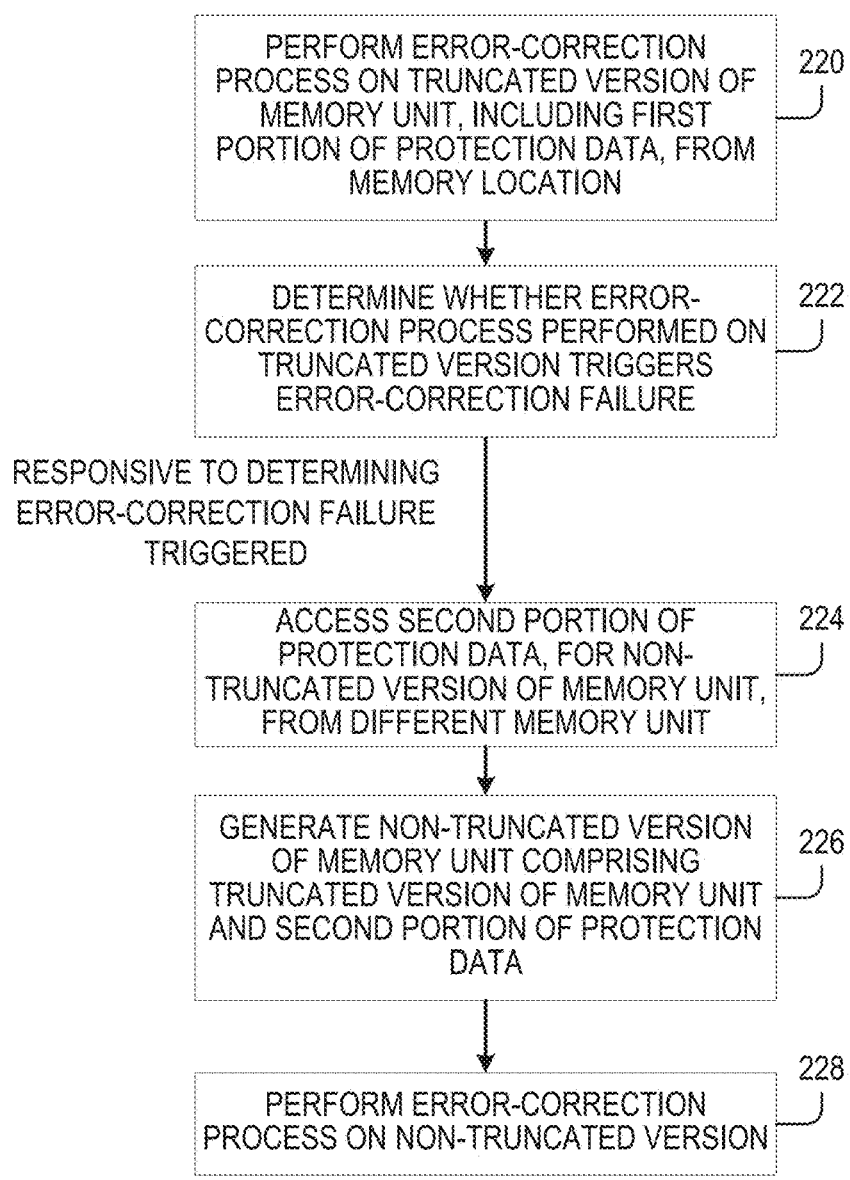
FIGS. 2 through 5 are flow diagrams of example methods for performing an operation on a memory unit having an extended size, in accordance with some embodiments of the present disclosure.

Referring now to the method 200 of FIG. 2, for some embodiments, the method 200 represents a method for processing a request, from a host system (e.g., 120), to read stored data from a memory address, where the memory address corresponds to a memory location (e.g., page) on a memory device (e.g., 130, 140) of the memory system (e.g., memory sub-system 110). At operation 220, a processing device (e.g., the processor 117 of the memory sub-system controller 115) performs an error-correction process on a truncated version of a memory unit accessed from the memory location, where the truncated version of the memory unit comprises a first portion of protection data for a non-truncated version of the memory unit and excludes a second portion of protection data for the non-truncated version of the memory unit. For some embodiments, the memory unit comprises a first codeword, where the first codeword comprises a payload portion and a non-payload portion, and where the payload portion is configured to store data provided by the host system, and the non-payload portion comprises the protection data. For example, the non-payload portion can comprise at least one of protection information for the first codeword, cyclic redundancy check (CRC) data for the first codeword, and metadata for the first codeword. Additionally, for some embodiments, the protection data can comprise parity data for the non-truncated version of the memory unit. For instance, the parity data can comprise low-density parity-check (LDPC) data for the non-truncated version of the memory unit, where the LDPC data can be used by a LDPC process to check and error correct the non-truncated version of the memory unit.

Though not illustrated in FIG. 2, the truncated version of a memory unit can be accessed from the memory location prior to operation 220. The processing device (e.g., the processor 117), at operation 222, determines whether the error-correction process performed on the truncated version of the memory unit triggers an error-correction failure.

For some embodiments, operation 220 (of performing the error-correction process on the truncated version of the memory unit) comprises performing the error-correction process on the truncated version of the memory unit such that the error-correction process uses the first portion of protection data (from the truncated version) and ignores the second portion of protection data excluded from the truncated version of the memory unit. Operation 220 can, for instance, cause (e.g., by instructing or configuring) the error-correction process to use the first portion of protection data and ignore the second portion of protection data (that is excluded from the truncated version of the memory unit). For various embodiments, the error-correction process comprises a low-density parity-check (LDPC) process, and the low-density parity-check process ignores the second portion of protection data excluded from the truncated version of the memory unit by using erasure zeroes (e.g., phantom zeroes).

In response to determining (at operation 222) that the error-correction process performed on the truncated version of the memory unit triggers the error-correction failure, at operation 224, the processing device (e.g., the processor 117) accesses the second portion of protection data (for the non-truncated version of the memory unit) from a different memory unit of the memory device (e.g., 130, 140). At operation 226, the processing device (e.g., the processor 117) generates the non-truncated version of the memory unit by combining the truncated version of the memory unit, accessed from the memory location, with the second portion of protection data accessed from the different memory unit (accessed at operation 224). For some embodiments, the memory unit comprises a first codeword, and the different memory unit comprises a second codeword. For example, the different codeword can be configured to store second portions of protection data for a plurality of codewords of the memory device (e.g., 130, 140), where the plurality of codewords includes the first codeword. Subsequently, at operation 228, the processing device (e.g., the processor 117) performs the error-correction process on the non-truncated version of the memory unit generated at operation 226 based on the first portion of protection data and the second portion of protection data. More regarding additional operations (based on operation 228) is illustrated and described with respect to FIG. 3.

Although not shown in FIG. 2, in response determining (at operation 222) that the error-correction process performed on the truncated version of the memory unit does not trigger the error-correction failure, the processing device (e.g., the processor 117) generates at least part of the response using a result produced by the error-correction process performed on the truncated version of the memory unit.

Figure 3:
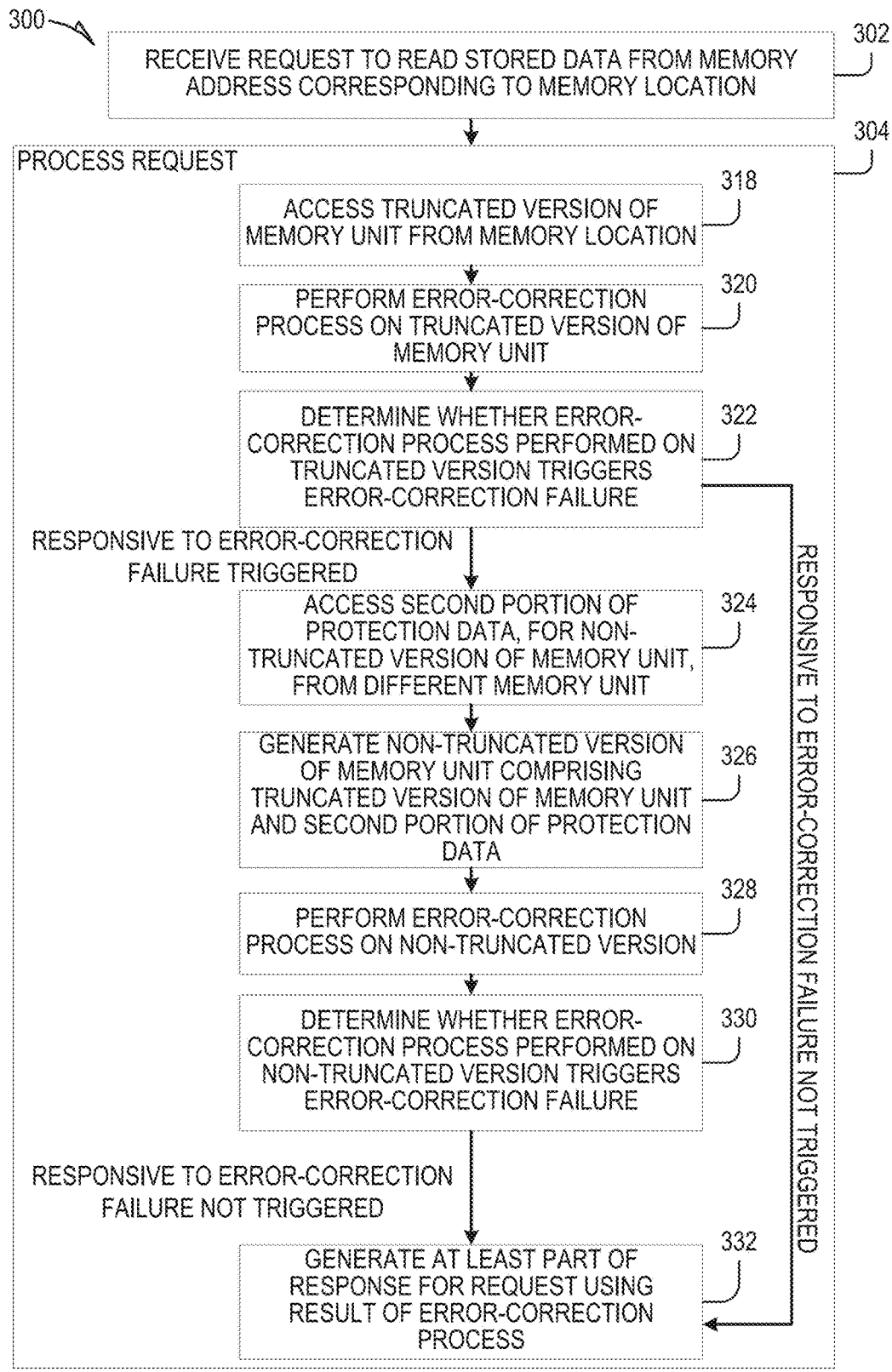

Referring now to the method 300 of FIG. 3, for some embodiments, the method 300 is similar to the method 200 of FIG. 2, where operations 320, 322, 324, 326, 328 are respectively similar to operations 220, 222, 224, 226, 228 of the method 200. At operation 302, a processing device (e.g., the processor 117 of the memory sub-system controller 115) receives, from a host system, a request to read stored data from a memory address, where the memory address corresponds to a memory location on the memory device (e.g., 130, 140). In response to receiving the request at operation 302, the processing device (e.g., the processor 117) processes the request (at operation 304) by performing operations 318 through 332.

At operation 318, the processing device (e.g., the processor 117) accesses a truncated version of a memory unit from the memory location, where the truncated version of the memory unit comprises a first portion of protection data for a non-truncated version of the memory unit and excludes a second portion of protection data for the non-truncated version of the memory unit. Operations 320 through 328 are performed after operation 318, where operations 320, 322, 324, 326, 328 are respectively similar to operations 220, 222, 224, 226, 228 of the method 200 of FIG. 2.

The processing device (e.g., the processor 117), at operation 330, determines whether the error-correction process performed on the non-truncated version of the memory unit (at operation 328) triggers the error-correction failure. In response to determining (at operation 330) that the error-correction process performed on the non-truncated version of the memory unit does not trigger the error-correction failure, the processing device (e.g., the processor 117) can stop processing the request to read the stored data, and can inform the host system (e.g., 120) that the request failed to process. Alternatively, in response to determining (at operation 330) that the error-correction process performed on the non-truncated version of the memory unit does not trigger the error-correction failure, at operation 332, the processing device (e.g., the processor 117) generates at least part of a response to the host system (e.g., 120), for the request (received at operation 302), using a result produced by the error-correction process performed (at operation 328) on the non-truncated version of the memory unit. Eventually, the generated response can be provided by (e.g., sent from) the memory system (e.g., the memory sub-system 110) to the host system (e.g., 120). The result produced by the error-correction process performed on the non-truncated version of the memory unit can comprise the non-truncated version of the memory unit with error-correction applied (by the error-correction process with use of the first portion of protection data, from the truncated version of the memory unit, and the second portion of protection data accessed from the different memory unit).

As also shown in FIG. 3, in response to determining (at operation 328) that the error-correction process performed on the truncated version of the memory unit does not trigger the error-correction failure, at operation 332, the processing device (e.g., the processor 117) generates at least part of the response using a result produced by the error-correction process performed (at operation 320) on the truncated version of the memory unit. The result produced by the error-correction process performed on the truncated version of the memory unit can comprise the truncated version of the memory unit with error-correction applied (by the error-correction process without use of the second portion of protection data).

Figure 4:
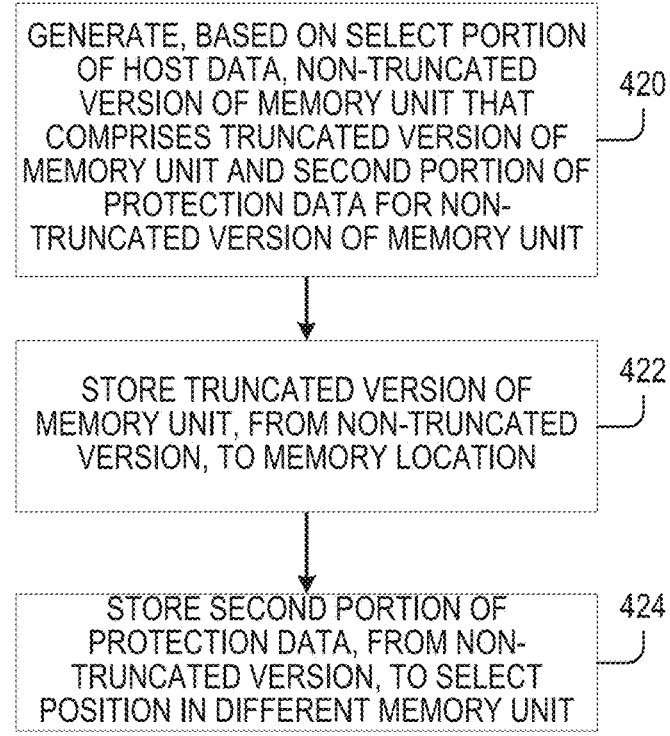

Referring now to the method 400 of FIG. 4, for some embodiments, the method 400 represents a method for processing a request, from a host system (e.g., 120), to write host data to a memory address, where the memory address corresponds to a memory location (e.g., page) on a memory device (e.g., 130, 140) of the memory system (e.g., memory sub-system 110). At operation 420, a processing device (e.g., the processor 117 of the memory sub-system controller 115) generates a non-truncated version of a memory unit based on a select portion of host data provided by a host system (e.g., 120), where the non-truncated version of the memory unit comprises: a truncated version of the memory unit that comprises a first portion of protection data for the non-truncated version of the memory unit; and a second portion of protection data for the non-truncated version of the memory unit. For some embodiment, the memory unit comprises a first codeword, where the first codeword comprises a payload portion and a non-payload portion, and where the payload portion is configured to store the select portion of the host data. For some embodiments, the non-payload portion comprises at least one of protection information for the first codeword, cyclic redundancy check (CRC) data for the first codeword, and metadata for the first codeword. Additionally, for some embodiments, the non-payload portion excludes the protection data.

The processing device (e.g., the processor 117), at operation 422, stores the truncated version of the memory unit, from the non-truncated version of the memory unit (generated at operation 420), to the memory location, where the truncated version of the memory unit excludes the second portion of protection data. Additionally, at operation 424, the processing device (e.g., the processor 117) stores the second portion of protection data, from the non-truncated version of the memory unit (generated at operation 420), to a select position in a different memory unit of the memory device. For some embodiments, the different memory unit comprises a second (different) codeword, where the second codeword can be configured to store second portions of protection data for a plurality of codewords of the memory device, and where the plurality of codewords includes the first codeword.

Figure 5:
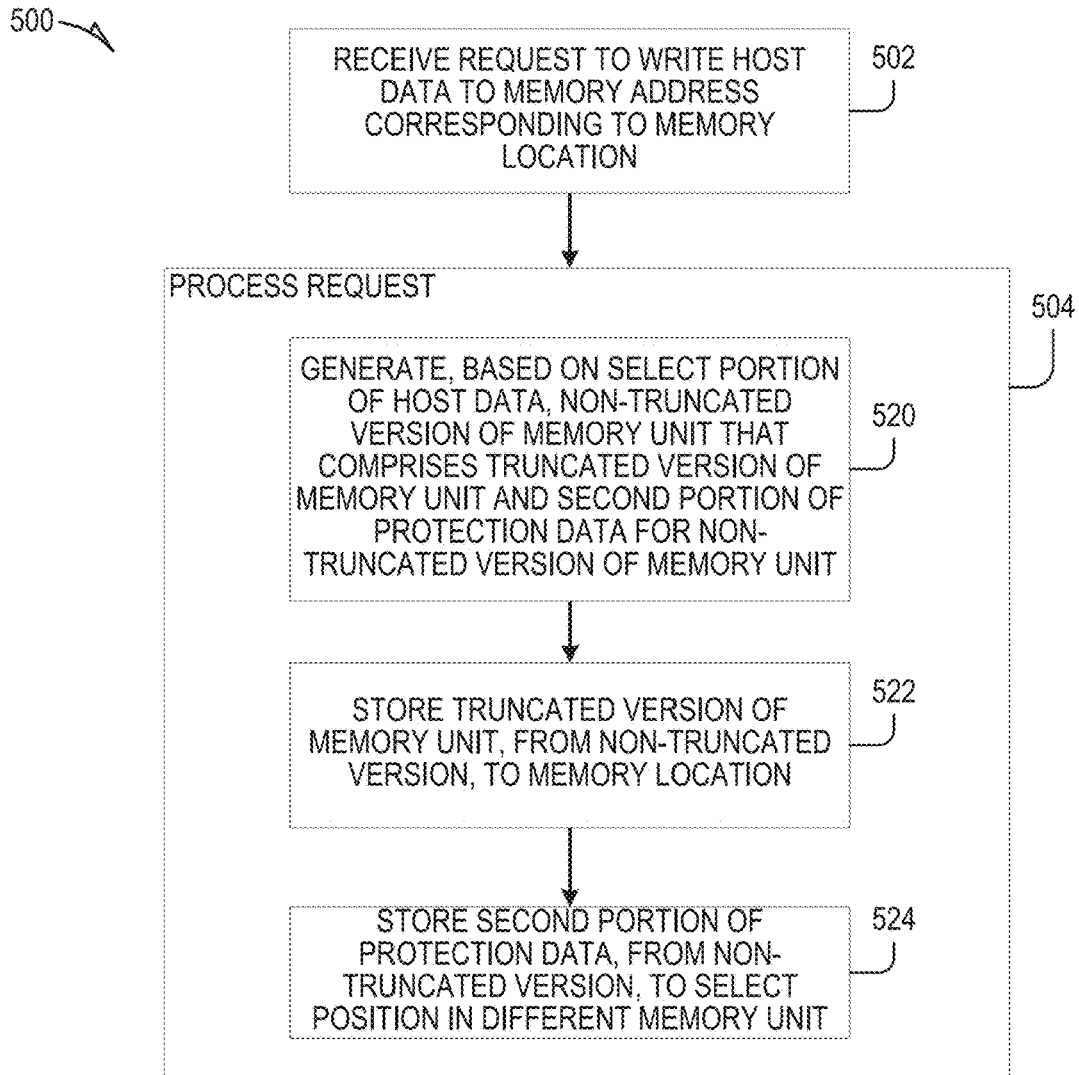

Referring now to the method 500 of FIG. 5, for some embodiments, the method 500 is similar to the method 400 of FIG. 4, where operations 520, 522, 524, are respectively similar to operations 420, 422, 424 of the method 400. At operation 502, a processing device (e.g., the processor 117 of the memory sub-system controller 115) receives, from a host system, a request to write host data to a memory address, where the memory address corresponds to a memory location on the memory device (e.g., 130, 140). In response to receiving the request at operation 502, the processing device (e.g., the processor 117) processes the request (at operation 504) by performing operations 520 through 524.

FIG. 6 is a diagram illustrating an example of a memory unit 600 having extended size, in accordance with some embodiments of the present disclosure. Depending on the embodiment, the memory unit 600 can be extended in size to accommodate more payload data (e.g., host data), accommodate more non-payload data (e.g., protection information or metadata), or both. The memory unit 600 represents a non-truncated version of the memory unit 600 prior to storage in accordance with various embodiments described herein, and a memory unit storage slot 610 represents a storage slot (e.g., of a page) to be used to store a truncated version of the memory unit 600. As shown, the memory unit 600 has a size that is larger than the memory unit storage slot 610 (e.g., has a size of a ¼ page) and, as such, various embodiments can truncate the memory unit 600 and puncture (e.g., divide at 620) protection data (as described herein) to enable the memory unit 600 to fit the memory unit storage slot 610. For instance, where a memory unit storage slot of a page has a size of 4588 bytes, the memory unit 600 (a non-truncated version thereof) can have a size of 4652 bytes, where the truncated version of the memory unit can have a size of 4588 bytes, and the excluded 64 bytes of the memory unit 600 (e.g., comprising protection data) can be stored at a different memory unit as described herein. In FIG. 6, the memory unit 600 comprises a payload portion 602 of the memory unit 600, which can store host data, and comprises a non-payload portion 604, which can store non-host data that can include protection data. For instance, as shown, the non-payload portion 604 can store protection information (PI), cyclic redundancy check (CRC) data computed across all the data of the memory unit 600 (designated as HCRC), metadata (MD) for the memory unit 600, cyclic redundancy check (CRC) data computed across the payload portion 602, and parity data 606 for the memory unit 600, where the parity data 606 can represent protection data for the memory unit 600. For some embodiments, the memory unit 600 implements a codeword having an extended size that is larger than a codeword storage slot to be used to store the codeword. According to various embodiments described herein, the parity data 606 is punctured (e.g., divided) into a first portion and a second portion such that: a truncated version of the memory unit 600, comprising the first portion of the parity data 606 but excluding the second portion of the parity data 606, can fit into the memory unit storage slot 610; and the second portion of the parity data 606 can be stored in another memory unit storage slot (e.g., for possible future retrieval in the event that error correction of the truncated version of the memory unit 600 using just the first portion of the parity data 606 fails).

Figure 7:
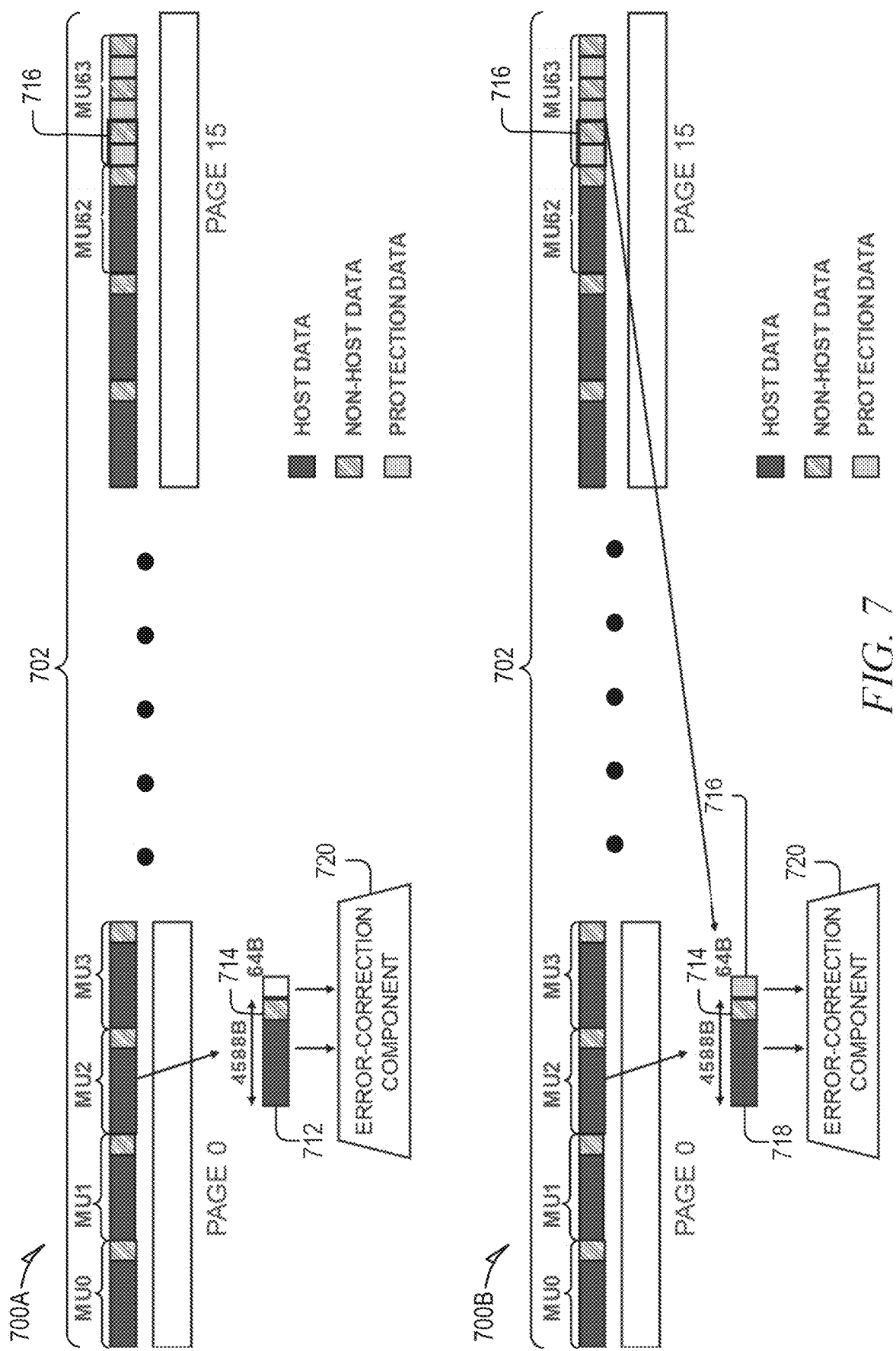
FIG. 7 is a diagram illustrating an example of truncated memory units and associated protection data and an example of performing an error-correction process, in accordance with some embodiments of the present disclosure.

FIG. 7 is a diagram illustrating an example of truncated memory units and associated protection data and an example of performing an error-correction process, in accordance with some embodiments of the present disclosure. In particular. FIG. 7 illustrates a super page 702 that comprises sixteen pages (pages 0 through 15) of a memory device (e.g., 130, 140). As shown, each page of the super page 702 comprises four memory unit storage slots to store four memory units (MUs). For instance, page 0 of the super page 702 is shown to store memory units 0 through 3 (MU0 through MU3) and page 15 of the super page 702 is shown to store memory units 60 through 63 (MU60 through MU63). According to various embodiments, each of the memory units 0 through 62 (MU0 through MU62) can represent a truncated version of a memory unit (e.g., similar to 600) that has a size that is larger than a memory unit storage slot provided by a page of the super page 702. For example, in FIG. 7, each memory unit storage slot can have a size sufficient to store a truncated version of a memory unit having a size of 4588 bytes, which can exclude 64 bytes of data of (the non-truncated version of) the memory unit. Additionally, according to various embodiments, as shown in FIG. 7, a portion of protection data excluded from each of the memory units 0 through 62 (MU0 through MU64) is stored in (e.g., in a respective position within) memory unit 63 (MU63). 700A and 700B of FIG. 7 illustrate operations of processing a request to read data stored (at least in part) in memory unit 2 (MU2) of the page 0 of the super page 702. Referring now to 700A of FIG. 7, when processing the request, various embodiments access the MU2, which stores a truncated version of a memory unit (4588 bytes thereof). Various embodiments then use an error-correction component 720 of a memory system (e.g., LDPC decoder) to perform an error-correction process on the accessed MU2 (which excludes a portion of protection data). At 712, FIG. 7 illustrates how MU2, which includes a first portion (714) of protection data and excludes the second portion (716) of protection data (64 bytes missing from MU2), can be fed into the error-correction component 720 as erasure or phantom zeroes, which can cause the error-correction component 720 (e.g., LDPC decoder) to ignore error correction of the missing bytes of the second portion of protection data.

Referring now to 700B of FIG. 7, where the error-correction process performed on MU2 causes the error-correction component 720 to trigger an error-correction failure (as described herein), various embodiments access, from memory unit 63 (MU63), the second portion (716) of protection data (64 bytes) associated with (corresponding to) the MU2. Various embodiments then use the error-correction component 720 of a memory system (e.g., LDPC decoder) to perform the error-correction process on the combination of the accessed MU2 (which excludes the second portion of protection data) and the second portion of protection data accessed from MU63. As described herein, the combination of the accessed MU2 and the second portion of protection data (accessed from MU63) can represent a non-truncated version of a memory unit. At 718, FIG. 7 illustrates how the combination of the accessed MU2 and the second portion of protection data accessed from MU63 are fed into the error-correction component 720. Where the error-correction process performed on the combination of the accessed MU2 and the second portion of protection data accessed from MU63 does not cause the error-correction component 720 to trigger an error-correction failure (as described herein), the result of the error-correction component process (e.g., output of the error-correction component 720) can be used to generate at least part of a response to the request to read the stored data.

Where MU2 represents a codeword, performing error-correction process on the 4588 byte of MU2 without its 64 bytes of the second portion of protection data (at 712) can represent a code rate of 0.93, which can cause an error-correction failure (e.g., hard LDPC failure) at a less than desirable rate. In comparison, performing error-correction process on the 4588 byte of MU2 with its 64 bytes of the second portion of protection data (at 716) can represent a code rate of 0.92, which represents a stronger correction power than 0.93 and a decrease in rate of error-correction failures (e.g., hard LDPC failures).

Figure 8A:
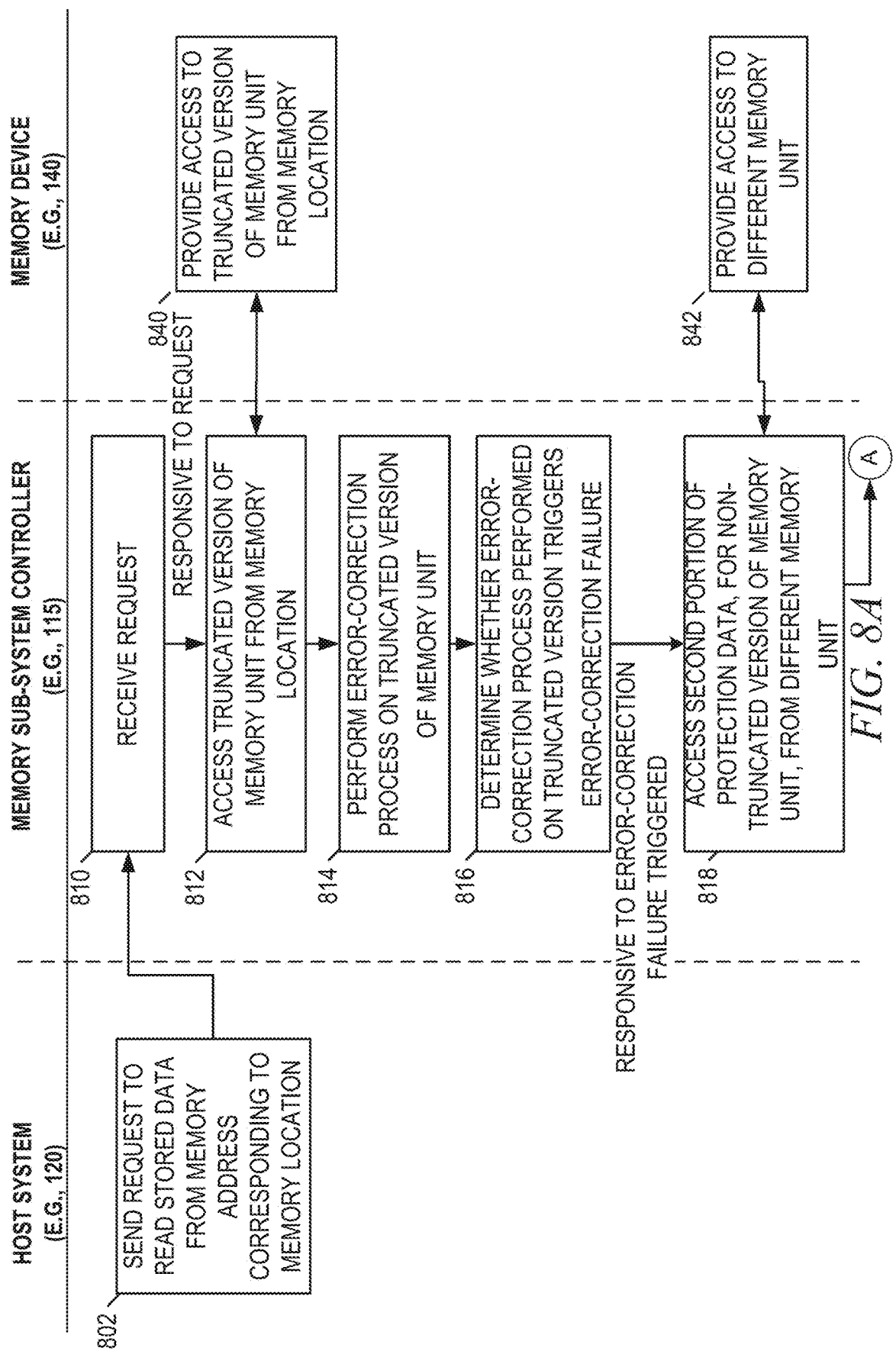
Figure 8C:
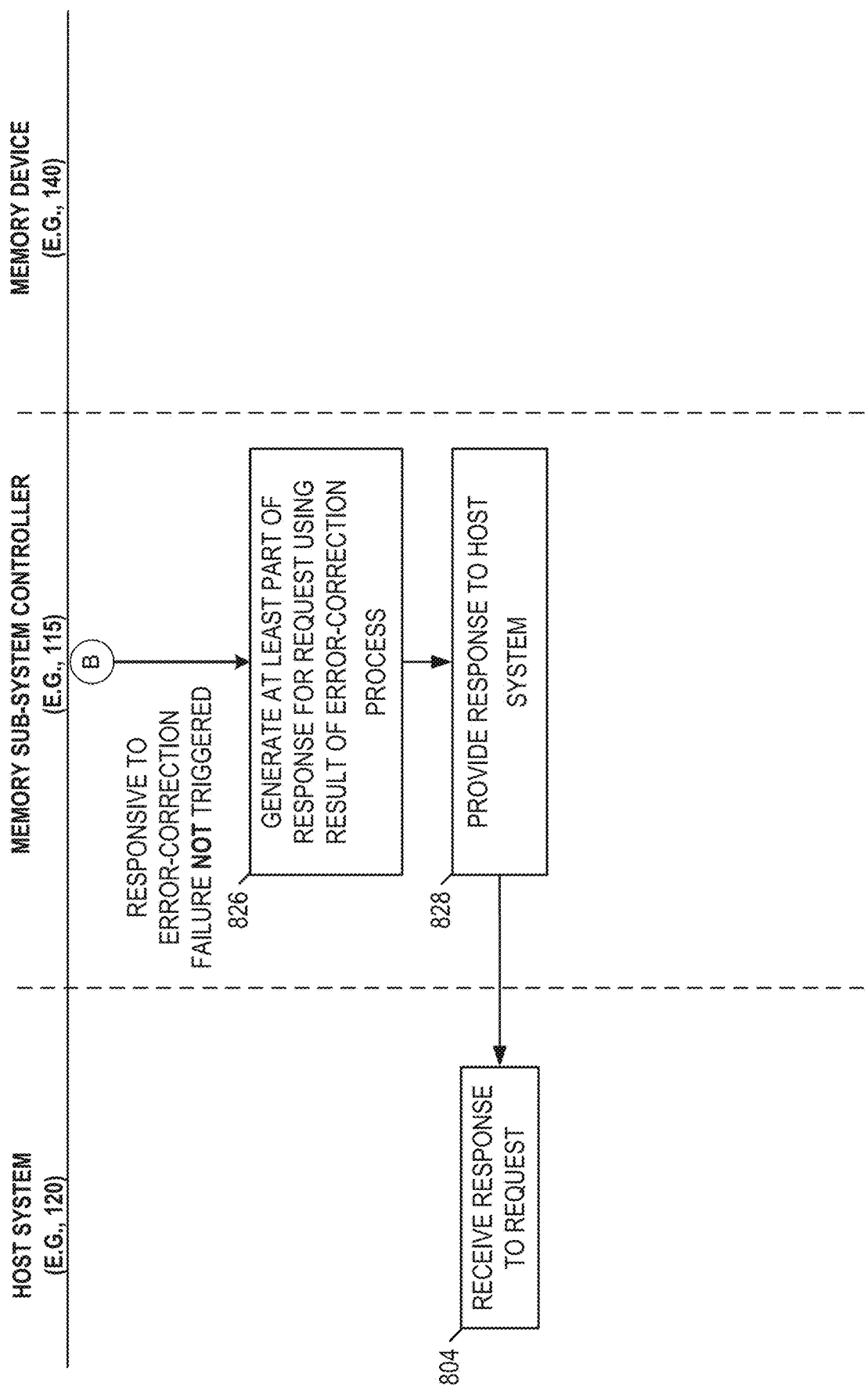

FIGS. 8A, 8B, and 8C provide an interaction diagram illustrating interactions between components of a computing environment in the context of some embodiments in which a method for processing a request to read stored data from a memory unit having extended size, as described herein, is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIGS. 8A through 8C, the host system can include the host system 120, the memory sub-system controller can include the memory sub-system controller 115, and the memory device can include the memory device 140.

As shown in FIG. 8A, at operation 802, the host system 120 sends, to the memory sub-system 110, a request to read stored data from a memory address, where the memory address corresponds to a memory location of the memory device 140. The memory sub-system controller 115, at operation 810, receives the request from the host system 120. In response to receiving the request, the memory sub-system controller 115 can process the received request. In particular, at operation 812, the memory sub-system controller 115 accesses a truncated version of a memory unit from the memory location, where the truncated version of the memory unit comprises a first portion of protection data for a non-truncated version of the memory unit and excludes a second portion of protection data for the non-truncated version of the memory unit. The memory device 140 provides the memory sub-system controller 115 with access to the truncated version of the memory unit at operation 840.

At operation 814, the memory sub-system controller 115 performs an error-correction process on the truncated version of the memory unit (accessed from the memory location) based on the first portion of protection data. Thereafter, at operation 816, the memory sub-system controller 115 determines whether the error-correction process performed (at operation 814) on the truncated version of the memory unit triggers an error-correction failure.

In response to determining (at operation 816) that the error-correction process performed on the truncated version of the memory unit triggers the error-correction failure, at operation 818, the memory sub-system controller 115 accesses the second portion of protection data (for the non-truncated version of the memory unit) from a different memory unit of the memory device 140. The memory device 140 provides the memory sub-system controller 115 with access to the different memory unit at operation 842.

Referring now to FIG. 8B, at operation 820, the memory sub-system controller 115 generates the non-truncated version of the memory unit by combining the truncated version of the memory unit, accessed from the memory location (at operation 812), with the second portion of protection data accessed from the different memory unit (at operation 818).

The memory sub-system controller 115 performs the error-correction process on the non-truncated version of the memory unit at operation 822 based on the first portion of protection data and the second portion of protection data. Thereafter, at operation 824, memory sub-system controller 115 determines whether the error-correction process performed on the non-truncated version of the memory unit triggers the error-correction failure.

Referring now to FIG. 8C, in response to determining (at operation 824) that the error-correction process performed on the non-truncated version of the memory unit does not trigger the error-correction failure, at operation 826, the memory sub-system controller 115 generates at least part of a response, to the host system 120, for the request received at operation 810. For various embodiments, the memory sub-system controller 115 generates at least part of a response using a result produced by the error-correction process performed on the non-truncated version of the memory unit at operation 822. For some embodiments, the response generated at operation 826 can include host data from a payload portion of the non-truncated version of the select memory unit, as provided via the result of the error-correction process (e.g., with error corrections applied). Subsequently, the memory sub-system controller 115 provides the response (generated at operation 826) to the host system 120 at operation 828. The host system 120, at operation 804, receives the response to the request it sent at operation 802.

Figure 9:
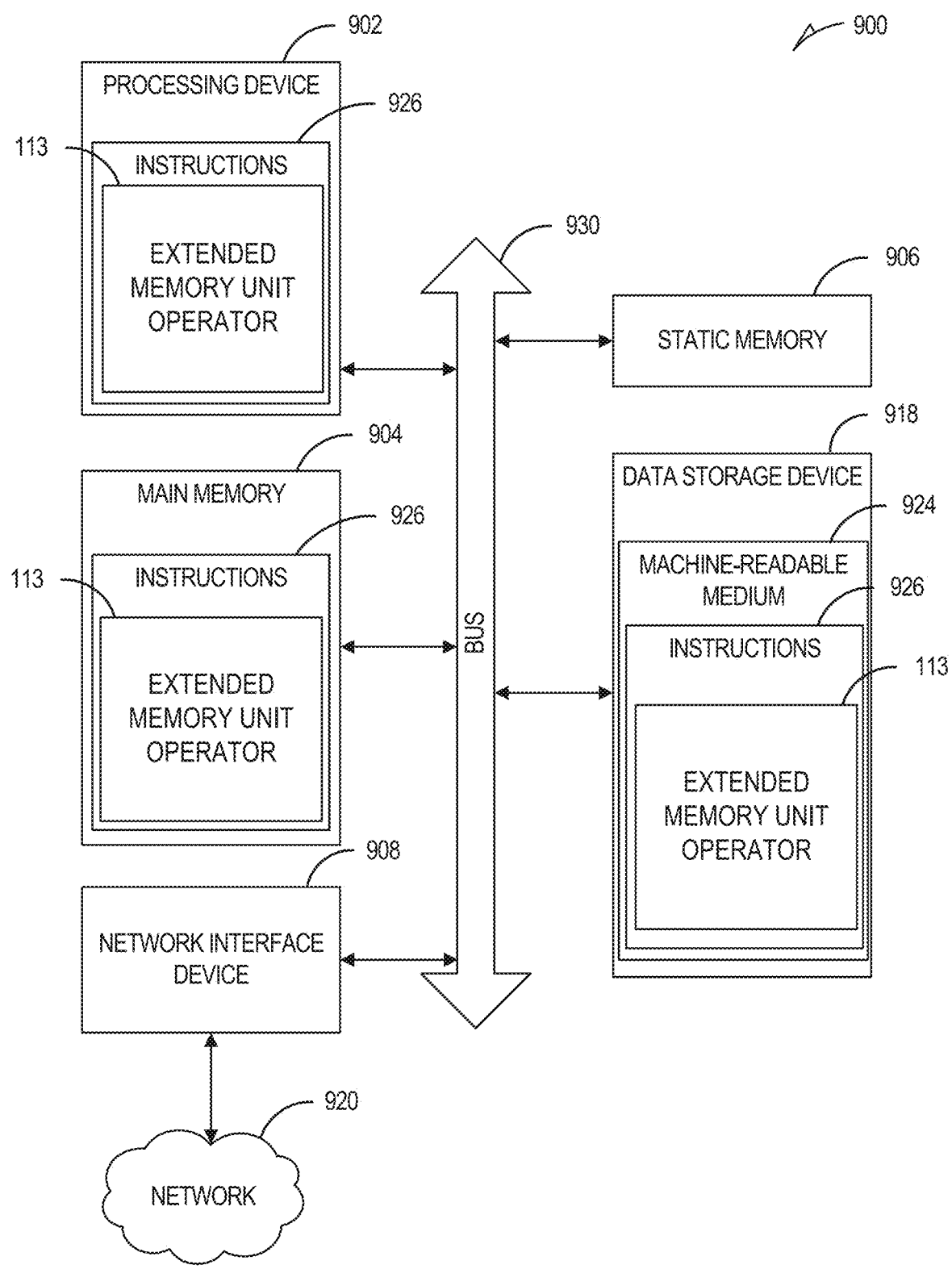
FIG. 9 is a block diagram of an example computer system in which embodiments of the present disclosure may operate.

FIG. 9 illustrates an example machine in the form of a computer system 900 within which a set of instructions can be executed for causing the machine to perform any one or more of the methodologies discussed herein. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

The processing device 902 represents one or more general-purpose processing devices such as a microprocessor, a central processing unit, or the like. More particularly, the processing device 902 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 902 can also be one or more special-purpose processing devices such as an application specific integrated circuit (ASIC), a field programmable gate array (FPGA), a digital signal processor (DSP), a network processor, or the like. The processing device 902 is configured to execute instructions 926 for performing the operations and steps discussed herein. The computer system 900 can further include a network interface device 908 to communicate over a network 920.

The data storage device 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage device 918, and/or main memory 904 can correspond to the memory sub-system 110 of FIG. 1.

In one embodiment, the instructions 926 include instructions to implement functionality corresponding to performing an operation on a memory unit having an extended size as described herein (e.g., the extended memory unit operator 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks. CD-ROMs, and magnetic-optical disks, read-only memories (ROMs), random access memories (RAMs), EPROMs. EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read-only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operably coupled to the memory device, configured to perform operations comprising:
receiving, from a host system, a first request to read stored data from a first memory address, the first memory address corresponding to a first memory location on the memory device; and
in response to receiving the first request, processing the first request by:
accessing a truncated version of a first memory unit from the first memory location, the truncated version of the first memory unit comprising a first portion of first protection data for a non-truncated version of the first memory unit and excluding a second portion of first protection data for the non-truncated version of the first memory unit;
performing an error-correction process on the truncated version of the first memory unit based on the first portion of first protection data;
determining whether the error-correction process performed on the truncated version of the first memory unit triggers an error-correction failure; and
in response to determining that the error-correction process performed on the truncated version of the first memory unit triggers the error-correction failure:
accessing the second portion of first protection data from a different memory unit of the memory device;
generating the non-truncated version of the first memory unit by combining the truncated version of the first memory unit, accessed from the first memory location, with the second portion of first protection data accessed from the different memory unit; and
performing the error-correction process on the non-truncated version of the first memory unit based on the first portion of first protection data and the second portion of first protection data.

2. The system of claim 1, wherein the operations comprise:
determining whether the error-correction process performed on the non-truncated version of the first memory unit triggers the error-correction failure; and
in response to determining that the error-correction process performed on the non-truncated version of the first memory unit does not trigger the error-correction failure, generating at least part of a response to the host system, for the first request, using a result produced by the error-correction process performed on the non-truncated version of the first memory unit.

3. The system of claim 2, wherein the result produced by the error-correction process performed on the non-truncated version of the first memory unit comprises the non-truncated version of the first memory unit with error-correction applied.

4. The system of claim 1, wherein the operations comprise:
in response determining that the error-correction process performed on the truncated version of the first memory unit does not trigger the error-correction failure, generating at least part of the response using a result produced by the error-correction process performed on the truncated version of the first memory unit.

5. The system of claim 1, wherein the first protection data comprises parity data for the non-truncated version of the first memory unit.

6. The system of claim 5, wherein the parity data comprises low-density parity-check (LDPC) data for the non-truncated version of the first memory unit.

7. The system of claim 1, wherein the first memory location comprises a page of the memory device.

8. The system of claim 1, wherein the first memory unit comprises a first codeword, and the different memory unit comprises a different codeword.

9. The system of claim 1, wherein the first memory unit comprises a first codeword, the first codeword comprising a payload portion and a non-payload portion, the payload portion configured to store data provided by the host system.

10. The system of claim 9, wherein the non-payload portion comprises at least one of protection information for the first codeword, cyclic redundancy check (CRC) data for the first codeword, and metadata for the first codeword.

11. The system of claim 1, wherein the different memory unit comprises a different codeword, the different codeword configured to store second portions of protection data for a plurality of codewords of the memory device.

12. The system of claim 1, wherein the error-correction process comprises a low-density parity-check (LDPC) process.

13. The system of claim 1, wherein the performing the error-correction process on the truncated version of the first memory unit comprises:
performing the error-correction process on the truncated version of the first memory unit such that the error-correction process uses the first portion of first protection data and ignores the second portion of first protection data excluded from the truncated version of the first memory unit.

14. The system of claim 13, wherein the error-correction process comprises a low-density parity-check (LDPC) process, and the low-density parity-check process ignores the second portion of first protection data excluded from the truncated version of the first memory unit by using erasure zeroes.

15. The system of claim 1, wherein the operations comprise:
receiving, from the host system, a second request to write host data to a second memory address, the second memory address corresponding to a second memory location on the memory device; and
in response to receiving the second request, processing the second request by:
storing a truncated version of a second memory unit to the second memory location, the truncated version of the second memory unit comprising a select portion of the host data, the truncated version of the second memory unit comprising a first portion of second protection data for a non-truncated version of the second memory unit and excluding a second portion of second protection data for the non-truncated version of the second memory unit; and
storing the second portion of second protection data to a select position in the different memory unit, the second portion of first protection data being stored in a different position in the different memory unit.

16. The system of claim 15, wherein the second memory unit comprises a first codeword, the first codeword comprising a payload portion and a non-payload portion, the payload portion configured to store the select portion of the host data.

17. The system of claim 16, wherein the non-payload portion comprises at least one of protection information for the first codeword, cyclic redundancy check (CRC) data for the first codeword, and metadata for the first codeword.

18. The system of claim 15, wherein the operations comprise:
prior to storing the truncated version of the second memory unit to the second memory location and storing the second portion of second protection data to the second position in the different memory unit, generating a non-truncated version of the second memory unit based on the select portion of the host data, the non-truncated version of the second memory unit comprising the truncated version of the second memory unit and comprising the second portion of second protection data.

19. A method comprising:
receiving at a memory system, from a host system, a request to write host data to a memory address, the memory address corresponding to a memory location on a memory device of the memory system; and
in response to receiving the request, processing the request by:
generating a non-truncated version of a memory unit based on a select portion of the host data, the non-truncated version of the memory unit comprising a truncated version of the memory unit that comprises a first portion of protection data for the non-truncated version of the memory unit, the non-truncated version of the memory unit comprising a second portion of protection data for the non-truncated version of the memory unit;
storing the truncated version of the memory unit, from the non-truncated version of the memory unit, to the memory location, the truncated version of the memory unit excluding the second portion of protection data; and
storing the second portion of protection data, from the non-truncated version of the memory unit, to a select position in a different memory unit of the memory device.

20. At least one non-transitory machine-readable storage medium comprising instructions that, when executed by a processing device of a memory system, cause the processing device to perform operations comprising:
processing a request, from a host system, to read stored data from a memory address, the memory address corresponding to a memory location on a memory device of the memory system, the processing the request comprising:
performing an error-correction process on a truncated version of a memory unit accessed from the memory location, the truncated version of the memory unit comprising a first portion of protection data for a non-truncated version of the memory unit and excluding a second portion of protection data for the non-truncated version of the memory unit, the error-correction process being performed on the truncated version of the memory unit based on the first portion of protection data;
determining whether the error-correction process performed on the truncated version of the memory unit triggers an error-correction failure; and
in response to determining that the error-correction process performed on the truncated version of the memory unit triggers the error-correction failure:
accessing the second portion of protection data from a different memory unit of the memory device;
generating the non-truncated version of the memory unit by combining the truncated version of the memory unit, accessed from the memory location, with the second portion of protection data accessed from the different memory unit; and
performing the error-correction process on the non-truncated version of the memory unit based on the first portion of protection data and the second portion of protection data.

* * * * *